United States Patent
Park et al.

(10) Patent No.: US 10,919,515 B2
(45) Date of Patent: Feb. 16, 2021

(54) DEVICE AND METHOD FOR CONTROLLING TRANSMISSION OF VEHICLE

(71) Applicants: HYUNDAI MOTOR COMPANY, Seoul (KR); KIA MOTORS CORPORATION, Seoul (KR)

(72) Inventors: Kwang Hee Park, Suwon-si (KR); Byeong Wook Jeon, Seoul (KR); Jae Chang Kook, Hwaseong-si (KR); Sang Jun Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 25 days.

(21) Appl. No.: 16/576,153

(22) Filed: Sep. 19, 2019

(65) Prior Publication Data
US 2020/0307545 A1    Oct. 1, 2020

(30) Foreign Application Priority Data
Mar. 27, 2019   (KR) .................. 10-2019-0035188

(51) Int. Cl.
*B60W 10/10*  (2012.01)
*B60W 10/06*  (2006.01)
*B60W 30/18*  (2012.01)

(52) U.S. Cl.
CPC ........... *B60W 10/10* (2013.01); *B60W 10/06* (2013.01); *B60W 30/18* (2013.01); *B60W 2552/15* (2020.02); *B60W 2710/0666* (2013.01); *B60W 2710/10* (2013.01)

(58) Field of Classification Search
CPC ..... Y10T 477/65; B60W 10/10; B60W 10/06; B60W 30/18; B60W 2552/15; B60W 2530/18; B60W 2710/10; B60W 2710/0666
See application file for complete search history.

(56) References Cited

U.S. PATENT DOCUMENTS 5,832,400 A  * 11/1998  Takahashi ......... B60W 30/1819
                                                              701/53
6,269,296 B1 *  7/2001  Toukura ............... B60W 30/18
                                                              701/80
(Continued)

*Primary Examiner* — Roger L Pang
(74) *Attorney, Agent, or Firm* — Morgan, Lewis & Bockius LLP

(57) ABSTRACT

A device and a method of controlling a transmission of a vehicle may include a determining device that compares road information related to a first road section corresponding to a road section on which the vehicle is currently traveling and a second road section disposed ahead of the first road section to determine a gradient of the second road section, a calculating device that determines an increase amount of a gradient-inducing resistance based on a difference between gradients of the first road section and the second road section according to a determination result from the determining device, and a controller that compares the increase amount of the gradient-inducing resistance with a reference value to perform transmission control and engine torque control based on comparison of the increase amount of the gradient-inducing resistance with the reference value.

21 Claims, 9 Drawing Sheets

(56) References Cited

U.S. PATENT DOCUMENTS

| | | | |
|---|---|---|---|
| 2012/0220422 A1* | 8/2012 | Wurthner | B60W 10/02 477/79 |
| 2018/0222483 A1* | 8/2018 | Yoon | B60W 10/06 |
| 2019/0100207 A1* | 4/2019 | Maruyama | B60W 20/11 |
| 2020/0198659 A1* | 6/2020 | Ooshima | B60W 30/18009 |

* cited by examiner

DEVICE AND METHOD FOR CONTROLLING TRANSMISSION OF VEHICLE

CROSS-REFERENCE TO RELATED APPLICATION

The present application claims priority to Korean Patent Application No. 10-2019-0035188, filed on Mar. 27, 2019, the entire contents of which is incorporated herein for all purposes by this reference.

BACKGROUND OF THE INVENTION

Field of the Invention

The present invention relates to a device and a method for controlling a transmission of a vehicle.

Description of Related Art

An automatic transmission automatically controls a target gear stage based on a driving situation and a driver's volition for acceleration, improving a driver's convenience.

The target gear stage of the automatic transmission is determined by a shift pattern input to a transmission control device. Furthermore, the shift pattern includes two axes of a vehicle speed and an open degree of an accelerator pedal. That is, the target gear stage is determined based on the driving situation represented by the vehicle speed and the driver's volition for the acceleration represented by the open degree of the accelerator pedal.

In general, when driving a gradient road, the driver recognizes a deceleration condition resulted from the gradient and increases the open degree of the accelerator pedal. This allows a vehicle to maintain a previous vehicle speed or accelerate.

At this time, as the open degree of the accelerator pedal abruptly increases, a kickdown shift occurs, which may cause an excessive downshift intermittently. Therefore, a drivability and a fuel efficiency may be lowered due to the excessive downshift.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device and a method for controlling a transmission of a vehicle that controls an engine torque and/or a target gear stage before entering a gradient road based on gradient information corresponding to a road section ahead collected from a navigation to prevent an excessive downshift from being occurring, improving a drivability and a fuel efficiency even when driving the gradient road.

The technical problems to be solved by the present inventive concept are not limited to the aforementioned problems, and any other technical problems not mentioned herein will be clearly understood from the following description by those skilled in the art to which an exemplary embodiment of the present invention pertains.

According to various aspects of the present invention, a vehicle transmission control device may include a determining device that compares road information related to a first road section corresponding to a currently traveling road section and a second road section disposed ahead of the first road section to determine a gradient of the second road section, a calculating device that determines an increase amount of a gradient-inducing resistance based on a difference between gradients of the first road section and the second road section according to a determination result from the determining device, and a controller that compares the increase amount of the gradient-inducing resistance with a reference value to perform transmission control and engine torque control based on comparison of the increase amount of the gradient-inducing resistance with the reference value.

The controller may downshift a gear stage and control an engine torque based on a driving force predicted at the downshifted state when the increase amount of the gradient-inducing resistance exceeds the reference value.

The calculating device may determine each driving force predicted when the gear stage is downshifted one stage by one stage when the increase amount of the gradient-inducing resistance exceeds the reference value.

The controller may be configured to determine a gear stage at which the calculated driving force is greater than or equal to the increase amount of the gradient-inducing resistance and determine a gear stage higher than the determined gear stage by one stage as a target gear stage.

The calculating device may determine a first engine torque increase amount based on an engine torque in the first road section, an engine torque in the second road section, and an engine torque increase amount when downshifting to the target gear stage when the gear stage is shifted to the target gear stage.

The controller may be configured to control an engine torque output based on a sum of an engine torque output value in the first road section and the first engine torque increase amount.

The reference value may be defined as a driving force predicted when a current gear stage is downshifted by one stage.

The controller may perform the engine torque control based on a current gear stage when the increase amount of the gradient-inducing resistance is equal to or smaller than the reference value.

The calculating device may determine a second engine torque increase amount based on a difference between an engine torque in the first road section and an engine torque in the second road section.

The controller may be configured to control an engine torque output based on a sum of an engine torque output value in the first road section and the second engine torque increase amount.

The controller may return to a previous driving control state when the vehicle passes through the second road section.

Furthermore, the device may further include a communicator that receives information related to a road ahead of the vehicle from a navigation.

According to various aspects of the present invention, a method for controlling a transmission of a vehicle may include comparing road information related to a first road section corresponding to a currently traveling road section and a second road section disposed ahead of the first road section to determine a gradient of the second road section, determining an increase amount of a gradient-inducing resistance based on a difference between gradients of the first road section and the second road section based on the determination result, and comparing the increase amount of the gradient-inducing resistance with a reference value to perform transmission control and engine torque control based on comparison of the increase amount of the gradient-inducing resistance with the reference value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
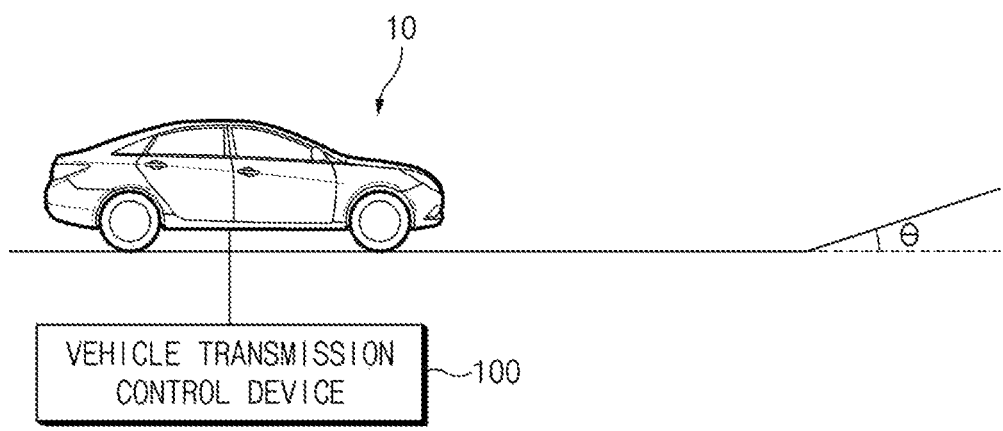
FIG. 1 illustrates a vehicle to which a vehicle transmission control device according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which an exemplary embodiment of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle to which a vehicle transmission control device according to an exemplary embodiment of the present invention is applied.

Referring to FIG. 1, a vehicle transmission control device 100 obtains information related to the road ahead from a navigation. In the present connection, the information related to the road ahead may include gradient information related to the road for a certain road section of the road ahead from a current position of a vehicle 10.

Furthermore, the vehicle transmission control device 100 may obtain the information related to the road ahead from one or more sensors provided on the vehicle 10.

Furthermore, the transmission control device 100 may determine and compare an increase amount of driving resistance based on a difference in gradient between a currently traveling road and the road ahead and a predicted driving force by a downshift in a gradient road driving. Furthermore, the transmission control device 100 may control an engine torque and/or target gear stage based on the comparison result.

Figure 2:
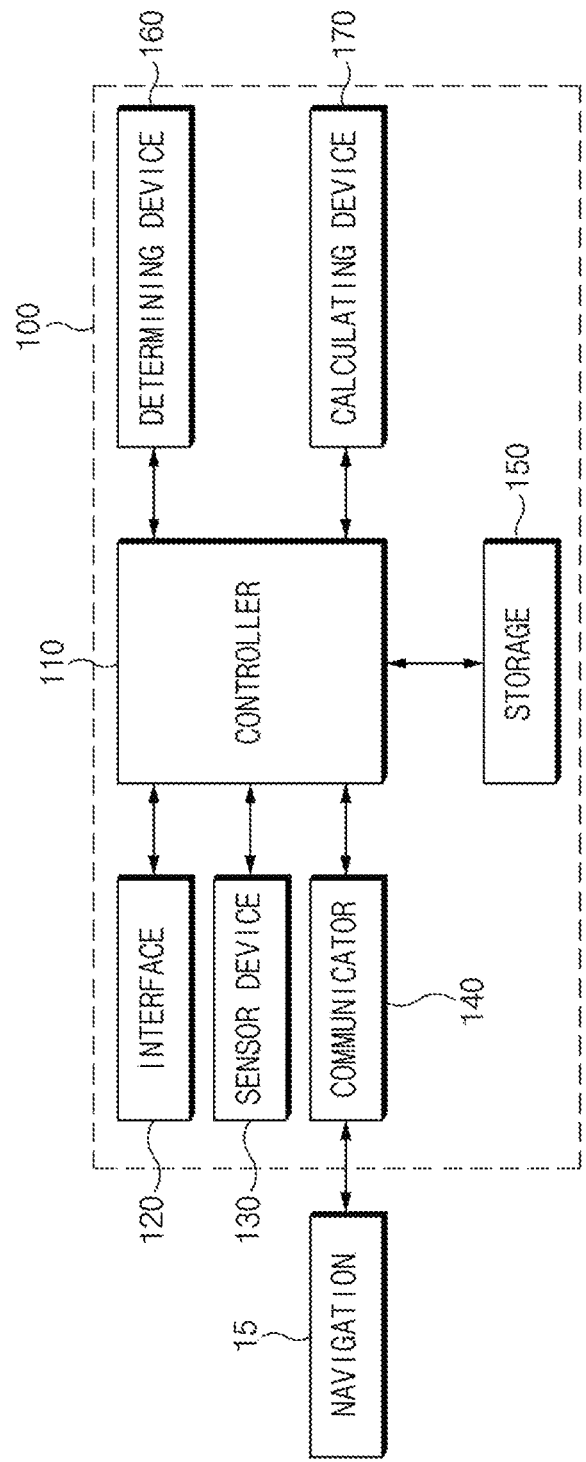
FIG. 2 illustrates a configuration of a vehicle transmission control device according to an exemplary embodiment of the present invention.

A detailed configuration of the vehicle transmission control device 100 is referred to an exemplary embodiment in FIG. 2.

The transmission control device 100 according to an exemplary embodiment of the present invention may be implemented within the vehicle 10. In the present connection, the transmission control device 100 may be formed integrally with internal control units of the vehicle 10. On the other hand, the transmission control device 100 may be implemented as a separate device and may be connected to the control units of the vehicle 10 via separate connection means.

FIG. 2 illustrates a configuration of a vehicle transmission control device according to an exemplary embodiment of the present invention.

Referring to FIG. 2, the transmission control device 100 according to an exemplary embodiment of the present invention may include a controller 110, an interface 120, a sensor device 130, a communicator 140, storage 150, a determining device 160, and a calculating device 170. In the present connection, the controller 110, the determining device 160, and the calculating device 170 of the transmission control device 100 according to the exemplary embodiment may be implemented as at least one processor.

The interface 120 may include input means for receiving a control command from a user and output means for outputting an operation state, a result, and the like of the device 100.

The input means may include a key button, and may include a mouse, a joystick, a jog shuttle, a stylus pen, and the like. The input means may also include a softkey implemented on a display.

The output means may include a display and may include voice output means such as a speaker. When a touch sensor such as a touch film, a touch sheet, a touch pad, or the like is provided on the display, the display operates as a touch screen and may be implemented in a form to which the input means and the output means are integrated.

In one example, the display may display the information related to the road ahead and may display transmission control information determined by the transmission control device 100.

The display may include at least one of a liquid crystal display (LCD), a thin film transistor-liquid crystal display (TFT LCD), an organic light-emitting diode (OLED), a flexible display, a field emission display (FED), and a 3-dimensional display (3D Display).

The sensor device 130 may include one or more sensors for detecting the information related to the road ahead of the vehicle 10.

Furthermore, the sensor device 130 may further include a sensor for measuring speed, acceleration, and/or APS, and the like of the vehicle 10.

The communicator 140 may include a communication module for vehicle network communications with electrical components and/or the control units provided in the vehicle 10.

The communication module may communicate with a navigation 15 provided in the vehicle 10 to receive the information related to the road ahead from the navigation 15. In one example, the communication module may receive the gradient information related to the road ahead from the navigation 15.

In an exemplary embodiment of the present invention, the gradient information related to the road ahead from the navigation 15 may include the gradient of the load on which the vehicle is currently traveling.

The communication module may also receive driving data (e.g., the speed, acceleration, APS, etc.) of the vehicle 10 from the control units or sensors provided in the vehicle 10.

In the present connection, a vehicle network communication technology may include a CAN (Controller Area Network) communication, a LIN (Local Interconnect Network) communication, a Flex-Ray communication, and the like.

Furthermore, the communicator 140 may further include a communication module supporting a wireless Internet access and/or a communication module supporting a short range communication. In the present connection, a wireless Internet technology may include a wireless LAN (WLAN), a wireless broadband (WIBRO), a Wi-Fi, a Worldwide Interoperability for Microwave Access (WiMAX), and the like. Furthermore, a short range communication technology may include a Bluetooth, a ZigBee, an Ultra Wideband (UWB), a Radio Frequency Identification (RFID), an Infrared Data Association (IrDA), and the like.

The storage 150 may store data and/or algorithms necessary for the transmission control device 100 to operate.

In one example, the storage 150 may store the gradient information related to the road ahead collected via the navigation 15 and/or the sensor device 130. The storage 150 may also store driving data of the vehicle 10 collected via the sensor device 130.

Furthermore, the storage 150 may store commands and/or algorithms, and the like for determining the driving resistance based on the difference between the gradients of the currently traveling road and the road ahead and the necessary driving force for the gradient road driving and performing the control of the engine torque and/or the transmission based on the determined driving resistance and necessary driving force.

In the present connection, the storage 150 may include storage media such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The controller 110 may request the navigation 15 and/or the sensor device 130 for the information related to the road ahead and the driving data during the driving. When the information related to the road ahead and the driving data are received by the navigation 15 and/or the sensor device 130, the controller 110 may transmit the relevant information to the determining device 160 and/or the calculating device 170.

The determining device 160 determines whether the gradient exists within a predetermined length of the road ahead based on the information related to the road ahead obtained by the navigation 15 and/or the sensor device 130. When it is identified that the gradient exists within the predetermined length of the road ahead, the determining device 160 transmits a shift event signal to the controller 110.

When the shift event signal is received from the determining device 160, the controller 110 transmits a control signal to the calculating device 170.

The calculating device 170 determines the increase amount of the gradient-inducing resistance based on the difference between road gradients of a currently traveling road section and a road section ahead in a response to a request of the controller 110. The calculating device 170 may determine the increase amount of the gradient-inducing resistance based on the difference between the road gradients of a first road section (the currently traveling road section) and a second road section (the road section ahead) using a following [Equation 1].

$$M = mg(\sin\theta_2 - \sin\theta_1) \qquad \text{[Equation 1]}$$

In [Equation 1], M means an increase amount of the gradient-inducing resistance, θ1 means a road slope of the first road section, and θ2 means a road slope of the second road section. In the present connection, θ may be derived as $\theta = \tan^{-1}(\text{gradient}/100)$.

Furthermore, the calculating device 170 may determine a driving force predicted when a current gear stage is downshifted. In one example, the calculating device 170 may determine a driving force of a current gear stage-1 stage using Equation (2) below.

$$P = \frac{Te_{D1} \times GR_{D1} \times FGR \times \eta}{R} \qquad \text{[Equation 2]}$$

In [Equation 2], P means a driving force of D1-stage, D1 means a current gear stage-1 stage, Te means an engine torque, GR means a gear ratio, FGR means a final speed reduction ratio, η means a transmission efficiency, and R is the tire dynamic radius.

The calculating device 170 transfers the increase amount of the gradient-inducing resistance and the driving force of the D1 stage determined by [Equation 1] and [Equation 2] to the controller 110.

Assuming that the vehicle speed, the engine torque, and the gear ratio are the same in the first and second road sections, a driving force required in the second road section increases by the increase amount of the gradient-inducing resistance based on the difference between the gradients of the first road section and the second road section.

Thus, the controller 110 compares the increase amount of the gradient-inducing resistance determined based on the difference between the gradients of the first road section and the second road section with a reference value, that is, a driving force predicted when the gear stage is downshifted by one stage and performs engine torque control and/or transmission control based on the comparison result.

When the increase amount of the gradient-inducing resistance is smaller than or equal to the driving force predicted when downshifting one stage, the controller 110 may determine to increase only the engine torque without shifting.

An exemplary embodiment of the operation of increasing only the engine torque without the shifting will be described with reference to FIG. 3 and FIG. 4.

Figure 3:
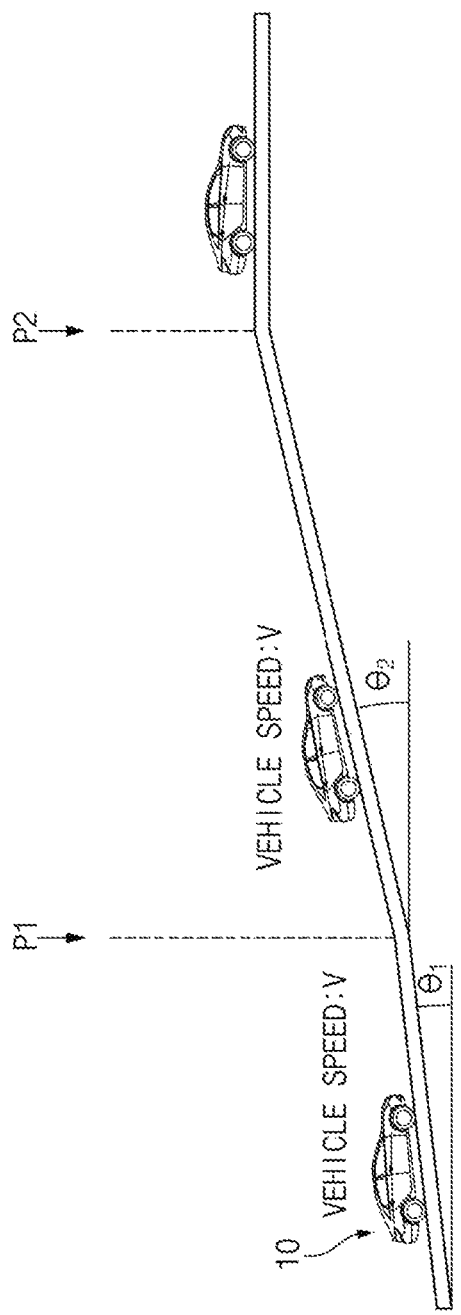
FIG. 3 and FIG. 4 illustrate an exemplary embodiment which is referenced to illustrate operations of a vehicle transmission control device according to various exemplary embodiments of the present invention.
Figure 4:
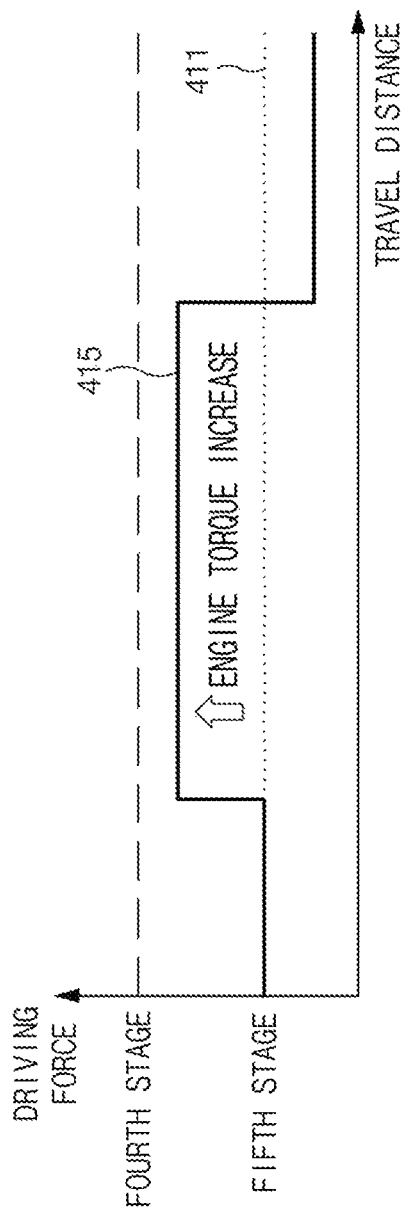

Referring to FIG. 3 and FIG. 4, assuming that the road slope of the first road section corresponding to a currently driving section is θ1 and the road slope of the second road section corresponding to a road section ahead is θ2, the calculating device 170 determines an increase amount of the gradient-inducing resistance based on a difference of θ2−θ1.

Furthermore, the calculating device 170 determines a driving force of a fourth-stage, which is one-stage downshifted when it is assumed that the current gear stage is a fifth-stage.

In the present connection, when a driving vehicle speed in the first and second road sections are the same as V, and when the driving force of the fourth-stage is greater than the increase amount of the gradient-inducing resistance resulted from the difference of θ2−θ1, the controller 110 increases the engine torque as indicated by a reference numeral 415 while maintaining the driving force of the fifth-stage as indicated by a reference numeral 411 without the shifting in the second road section, as shown in FIG. 4.

An increase amount of the engine torque when increasing only the engine torque without the transmission control may be determined by referring to [Equation 3] below.

$$\Delta Te = Te_2 - Te_1 = \mathrm{mg}(\sin\theta_2 - \sin\theta_1) \times \frac{R}{GR_1 \times FGR \times \eta} \quad \text{[Equation 3]}$$

In [Equation 3], ΔTe means an increase amount of the engine torque, Te2 means an engine torque in the second road section, Te1 means an engine torque in the first road section, θ1 means the road slope of the first road section, θ2 means the road slope of the second road section, GR1 means a gear ratio, FGR means the final reduction ratio, η means the transmission efficiency, and R means the tire dynamic radius.

Accordingly, the calculating device 170 determines the increase amount of the engine torque based on [Equation 3], and transmits the determination result to the controller 110.

Thus, before entering the second road section, the controller 110 may control a final engine torque output value (TQtotal) based on a sum of a base engine torque output value (TQbase) and the engine torque increase amount (ΔTe) previously determined based on [Equation 3], as shown in [Equation 4] below.

$$TQ_{total} = TQ_{base} + \Delta Te \quad \text{[Equation 4]}$$

Furthermore, when the increase amount of the gradient-inducing resistance is greater than the driving force predicted when downshifting one stage, the controller 110 may determine to perform the transmission control. The controller 110 may increase the engine torque based on the driving force when the transmission control is performed.

An exemplary embodiment of the operation of performing the transmission control and the engine torque control will be described with reference to FIG. 5 and FIG. 6.

Figure 5:
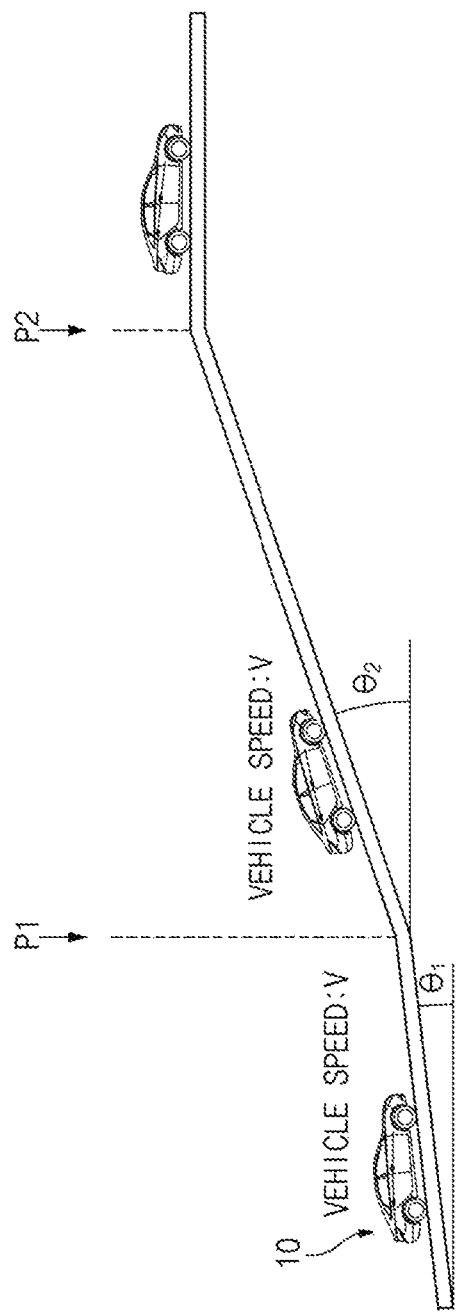
FIG. 5 and FIG. 6 illustrate an exemplary embodiment which is referenced to illustrate operations of a vehicle transmission control device according to various exemplary embodiments of the present invention.
Figure 6:
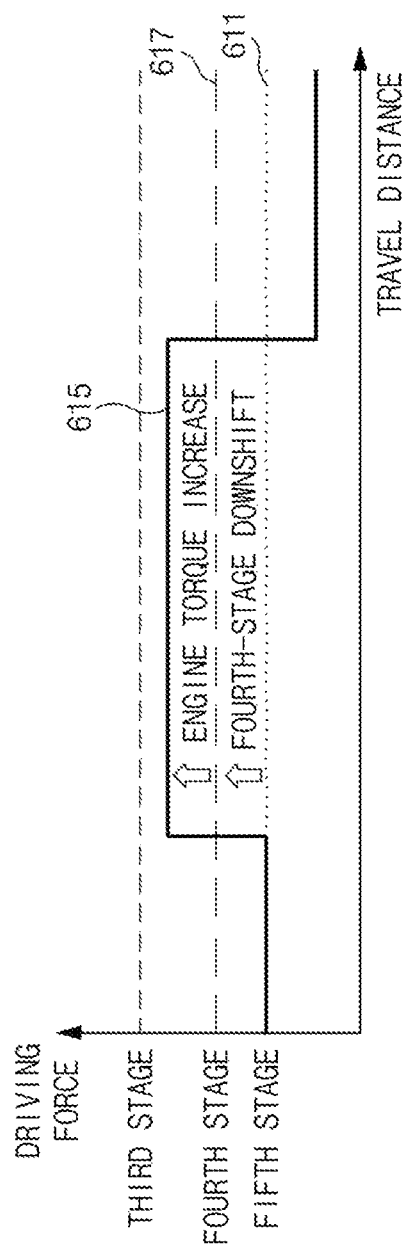

Referring to FIG. 5 and FIG. 6, assuming that the road slope of the first road section corresponding to the currently driving road section is θ1 and the road slope of the second road section corresponding to the road section ahead is θ2, the calculating device 170 determines the increase amount of the gradient-inducing resistance based on the difference of θ2−θ1.

Furthermore, the calculating device 170 determines the driving force of the fourth-stage, which is one-stage downshifted when it is assumed that the current gear stage is the fifth-stage.

When the driving vehicle speed in the first and second road sections are the same as V, and when the driving force of the fourth-stage is smaller than the increase amount of the gradient-inducing resistance resulted from the difference of θ2−θ1, the calculating device 170 determines a driving force of a third-stage, which is two stages downshifted. In the present connection, the calculating device 170 may repeat the determination until the driving force at the downshifted state has a value equal to or greater than the increase amount of the gradient-inducing resistance.

When the driving vehicle speed in the first and second road sections are the same as V, and when the driving force of the third-stage is equal to or greater than the increase amount of the gradient-inducing resistance based on the difference of θ2−θ1, the controller 110 performs the transmission control and the engine torque increase control in the second road section as shown in FIG. 6.

The controller 110 determines the target gear stage of the second road section as the fourth-stage in which the downshifted driving force does not exceed the increase amount of the gradient-inducing resistance and performs the transmission control such that a fourth-stage driving force of a reference numeral 617 is output from a driving force of a reference numeral 611.

Furthermore, the controller 110 increases the engine torque as indicated by a reference numeral 615 to cope with an increase amount of the gradient-inducing resistance exceeding the fourth-stage driving force.

When increasing the engine torque after the transmission control, an increase amount of the engine torque may be determined by referring to [Equation 5] below.

$$\Delta Te = Te_2 - (Te_1 + Te_{D1}) = \\ \mathrm{mg}(\sin\theta_2 - \sin\theta_1) \times \frac{R}{GR_1 \times FGR \times \eta} - Te_{D1} \quad \text{[Equation 5]}$$

In [Equation 5], ΔTe means the increase amount of the engine torque, Te2 means the engine torque in the second road section, Te1 means the engine torque in the first road section, TeD1 means the increase amount of the engine torque in the one stage downshift, θ1 means the road slope of the first road section, θ2 means the road slope of the second road section, GR1 means a gear ratio in the first road section, FGR means the final reduction ratio, η means the transmission efficiency, and R means the tire dynamic radius.

Accordingly, the calculating device 170 determines the increase amount of the engine torque based on [Equation 5], and transmits the determination result to the controller 110.

Thus, before entering the second road section, the controller 110 may control the final engine torque output value (TQtotal) based on the sum of the base engine torque output value (TQbase) and the engine torque increase amount (ΔTe) previously determined based on [Equation 5].

Upon entering a flat road section after passing through the second road section, the controller 110 may return the target gear stage and the engine torque to previous driving control values.

Likewise, the transmission control device 100 according to an exemplary embodiment of the present invention performs the transmission control and/or the engine torque control based on the difference between the gradients of the currently traveling road section and the road section ahead upon entering the slope way such that an excessive downshift may be prevented, preventing a fuel efficiency from being lowered and improving a driving satisfaction of the driver.

The vehicle transmission control device 100 according to the exemplary embodiment operating as described above may be implemented in a form of an independent hardware device including a memory and a processor that processes each operation and may be implemented in a form which is mounted in another hardware device such as a microprocessor or a general purpose computer system.

An operation flow of the vehicle transmission control device according to an exemplary embodiment of the present invention configured as described above will be described in more detail as follows.

Figure 7:
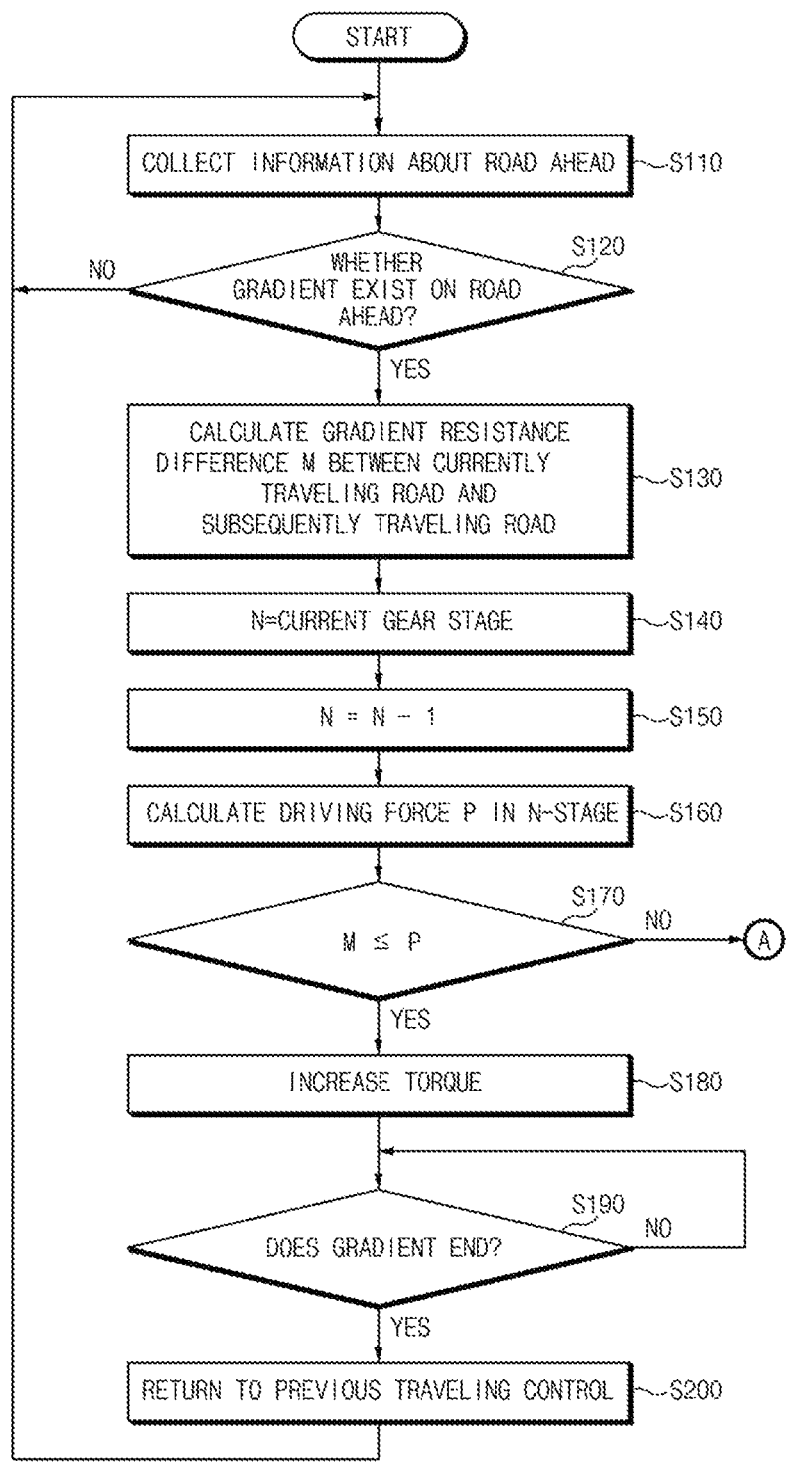
FIG. 7 and FIG. 8 are flowcharts of a method for controlling a transmission of a vehicle according to an exemplary embodiment of the present invention.
Figure 8:
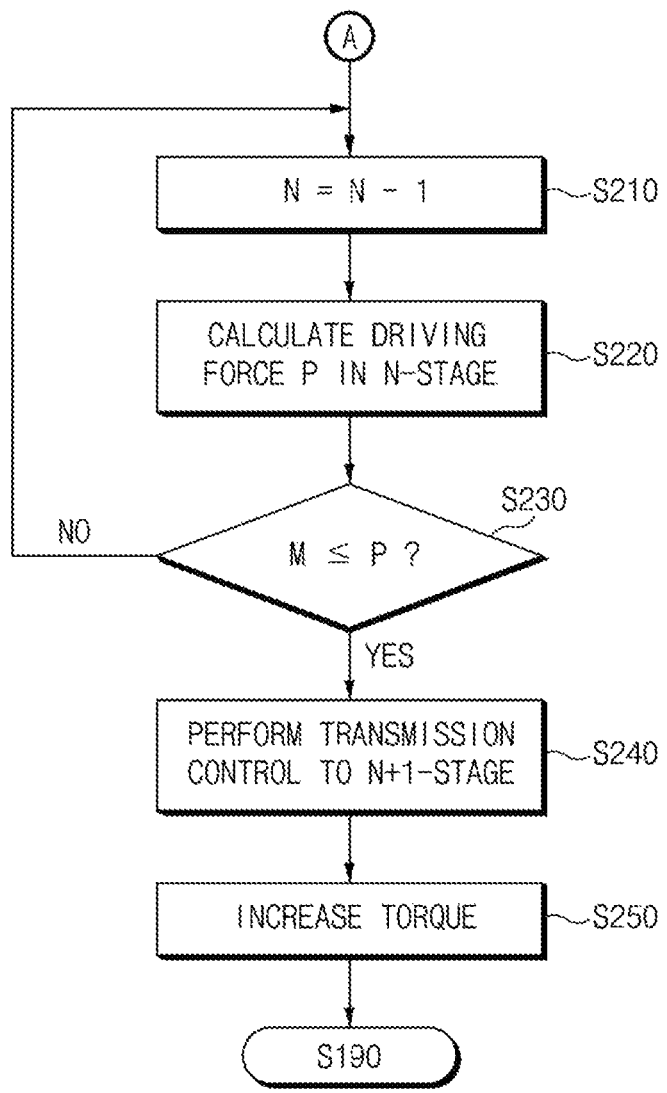

FIG. 7 and FIG. 8 are flowcharts of a method for controlling a transmission of a vehicle according to an exemplary embodiment of the present invention.

Referring to FIG. 7, the transmission control device 100 collects the information related to the road ahead from the navigation during the driving (S110). At the instant time, the transmission control device 100 may collect the gradient information related to the second road section within a predetermined distance ahead. The transmission control device 100 may collect the gradient information related to the second road section corresponding to the road section ahead via or more sensors. Furthermore, the transmission control device 100 may collect the driving data of the vehicle via or more sensors.

When it is identified that the subsequently traveling gradient road exists based on the information related to the road ahead collected in 'S110', the transmission control device 100 determines the increase amount of the gradient-inducing resistance (difference) M of the currently traveling road section and the road section ahead (S130).

Furthermore, the transmission control device 100 determines the driving force P predicted when the current gear stage is one stage downshifted (S140 to S160).

When the increase amount of the gradient-inducing resistance M determined in 'S130' is smaller than or equal to the driving force P at the downshifted state determined in 'S160' (S170), the transmission control device 100 increases only the engine torque without the shifting (S180).

The transmission control device 100 maintains the target gear stage and the engine torque in the gradient road section, and when the gradient road section ends (S190), returns to a previous driving control state (S200).

Furthermore, when the increase amount of the gradient-inducing resistance M is greater than the driving force P at the downshifted state in 'S170', the transmission control device 100 performs processes after 'A' in FIG. 8.

When the increase amount of the gradient-inducing resistance M is greater than the driving force P at the downshifted state, the transmission control device 100 determines the driving force P when an additional one stage downshift is performed in the one stage downshifted state (S210 to S220), as shown in FIG. 8.

The transmission control device 100 repeats the processes of 'S210' and 'S220' until the increase amount of the gradient-inducing resistance M determined in 'S130' in FIG. 7 is equal to or smaller than the driving force P at the downshifted state determined in 'S220' in FIG. 8.

When the increase amount of the gradient-inducing resistance M is smaller than or equal to the driving force P at the downshifted state (S170), the transmission control device 100 performs the transmission control to the downshifted target gear stage+1 stage (S240). In one example, when the increase amount of the gradient-inducing resistance M is smaller than or equal to a driving force of a downshifted N(=3)-stage in 'S220', the transmission control device 100 performs the transmission control to a fourth-stage, which is (N+1)-stage.

Furthermore, the transmission control device 100 determines the increase amount of the engine torque based on the driving force of the downshifted gear stage and increases the engine torque based on the determined increase amount (S250).

The transmission control device 100 maintains the target gear stage and the engine torque in the gradient road section, and when the gradient road section ends (S190), returns to the previous driving control state (S200).

Figure 9:
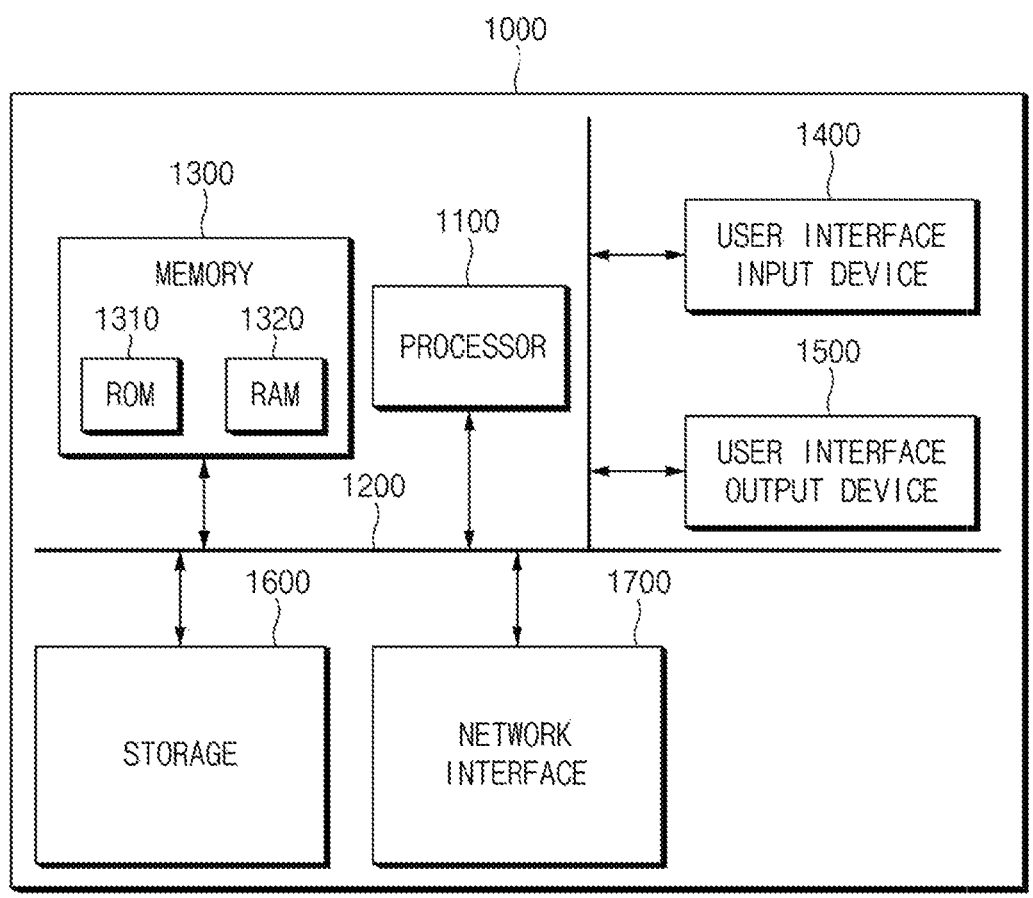
FIG. 9 illustrates a computing system in which a method according to an exemplary embodiment of the present invention is implemented.

FIG. 9 illustrates a computing system in which a method according to an exemplary embodiment of the present invention is implemented.

Referring to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in a hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

According to an exemplary embodiment of the present invention, an engine torque and/or a target gear stage is controlled before entering a gradient road based on gradient information corresponding to a road section ahead collected from a navigation to prevent an excessive downshift from being occurring, improving a drivability and a fuel efficiency even when driving the gradient road.

Hereinabove, although the present invention has been described with reference to exemplary embodiments and the accompanying drawings, the present invention is not limited thereto, but may be variously modified and altered by those skilled in the art to which an exemplary embodiment of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle transmission control device comprising:
a determining device configured to compare road information related to a first road section corresponding to a road section on which the vehicle is currently traveling and a second road section disposed ahead of the first road section to determine a gradient of the second road section;
a calculating device connected to the determining device and configured to determine an increase amount of a gradient-inducing resistance based on a difference between a gradient of the first road section and the gradient of the second road section; and
a controller connected to the determining device and the calculating device and configured to compare the increase amount of the gradient-inducing resistance with a reference value to perform transmission control and engine torque control based on comparison of the increase amount of the gradient-inducing resistance with the reference value.

2. The vehicle transmission control device of claim 1, wherein the controller is configured to downshift a gear stage and to control an engine torque based on a driving force predicted at a downshifted state upon determining that the increase amount of the gradient-inducing resistance is greater than the reference value.

3. The vehicle transmission control device of claim 2, wherein the calculating device is configured to determine each driving force predicted when the gear stage is downshifted one stage by one stage upon determining that the increase amount of the gradient-inducing resistance is greater than the reference value.

4. The vehicle transmission control device of claim 3, wherein the controller is configured to:
determine a gear stage at which the determined driving force is greater than or equal to the increase amount of the gradient-inducing resistance; and
determine a gear stage higher than the determined gear stage by one stage as a target gear stage.

5. The vehicle transmission control device of claim 4, wherein the calculating device is configured to determine a first engine torque increase amount based on an engine torque in the first road section, an engine torque in the second road section, and an engine torque increase amount when downshifting to the target gear stage upon determining that the gear stage is shifted to the target gear stage.

6. The vehicle transmission control device of claim 5, wherein the controller is configured to control an engine torque output based on a sum of an engine torque output value in the first road section and the first engine torque increase amount.

7. The vehicle transmission control device of claim 1, wherein the reference value is defined as a driving force predicted when a current gear stage is downshifted by one stage.

8. The vehicle transmission control device of claim 1, wherein the controller is configured to perform the engine torque control based on a current gear stage when the increase amount of the gradient-inducing resistance is equal to or lower than the reference value.

9. The vehicle transmission control device of claim 8, wherein the determining device is configured to determine a second engine torque increase amount based on a difference between an engine torque in the first road section and an engine torque in the second road section.

10. The vehicle transmission control device of claim 9, wherein the controller is configured to control an engine torque output based on a sum of an engine torque output value in the first road section and the second engine torque increase amount.

11. The vehicle transmission control device of claim 1, wherein the controller is configured to return to a previous driving control state when the vehicle passes through the second road section.

12. The vehicle transmission control device of claim 1, further including:
a communicator connected to the controller and configured to receive the road information related to a road ahead of the vehicle from a navigation, wherein the information related to the road ahead of the vehicle includes the gradient of the first road section and the gradient of the second road section.

13. A method of controlling a transmission of a vehicle, the method comprising:
comparing road information related to a first road section corresponding to a road section on which the vehicle is currently traveling and a second road section disposed ahead of the first road section to determine a gradient of the second road section;

determining an increase amount of a gradient-inducing resistance based on a difference between a gradient of the first road section and the gradient of the second road section; and comparing the increase amount of the gradient-inducing resistance with a reference value to perform transmission control and engine torque control based on comparison of the increase amount of the gradient-inducing resistance with the reference value.

14. The method of claim 13, further including:

determining each driving force predicted when a gear stage is downshifted one stage by one stage when the increase amount of the gradient-inducing resistance is greater than the reference value.

15. The method of claim 14, wherein the performing of the transmission control and the engine torque control includes:

determining a gear stage at which the determined driving force is greater than or equal to the increase amount of the gradient-inducing resistance;

determining a gear stage higher than the determined gear stage by one stage as a target gear stage; and performing a downshifting to the determined target gear stage.

16. The method of claim 15, wherein the performing of the transmission control and the engine torque control includes:

determining a first engine torque increase amount based on an engine torque in the first road section, an engine torque in the second road section, and an engine torque increase amount when downshifting to the target gear stage.

17. The method of claim 16, wherein the performing of the transmission control and the engine torque control further includes:

controlling an engine torque output based on a sum of an engine torque output value in the first road section and the first engine torque increase amount.

18. The method of claim 13, further including:

performing the engine torque control based on a current gear stage when the increase amount of the gradient-inducing resistance is equal to or lower than the reference value.

19. The method of claim 18, wherein the performing of the engine torque control includes:

determining a second engine torque increase amount based on a difference between an engine torque in the first road section and an engine torque in the second road section.

20. The method of claim 19, wherein the performing of the engine torque control includes:

controlling an engine torque output based on a sum of an engine torque output value in the first road section and the second engine torque increase amount.

21. The method of claim 13, further including:

receiving the road information related to the second road section before the determining of the gradient of the second road section.

* * * * *